United States Patent [19]
Cimperman et al.

[11] Patent Number: 5,224,409
[45] Date of Patent: Jul. 6, 1993

[54] APPARATUS FOR PRODUCING HELICAL SLICES

[75] Inventors: Frederick J. Cimperman, Dublin; Klaus Silbermann, Sunol, both of Calif.

[73] Assignee: Ashlock Company, San Leandro, Calif.

[21] Appl. No.: 722,600

[22] Filed: Jun. 27, 1991

Related U.S. Application Data

[63] Continuation-in-part of Ser. No. 672,037, Mar. 19, 1991, abandoned.

[51] Int. Cl.⁵ ............................................. B26D 3/26
[52] U.S. Cl. .................................... 83/862; 83/102; 83/356.3; 83/592; 83/932
[58] Field of Search ............... 83/356.3, 592, 672, 83/666, 102, 862; 241/932, 92

[56] References Cited

U.S. PATENT DOCUMENTS

| | | | |
|---|---|---|---|
| 419,364 | 1/1890 | Schoell | 83/356.3 |
| 3,783,727 | 1/1974 | Brignard et al. | 83/592 |
| 3,869,773 | 3/1975 | Gneiding | 241/92 X |
| 3,874,259 | 4/1975 | Chambos et al. | 83/408 X |
| 3,952,621 | 4/1976 | Chambos | 83/408 X |
| 4,198,887 | 4/1980 | Williams, Jr. | 83/356.3 |
| 4,256,265 | 3/1981 | Madan | 83/356.3 X |
| 4,367,667 | 1/1983 | Shibata | 83/356.3 |
| 4,387,111 | 6/1983 | Mullender | 426/615 |
| 4,619,192 | 10/1986 | Cycyk et al. | 99/538 |
| 4,628,808 | 12/1986 | Simon | 99/538 |
| 4,644,838 | 2/1987 | Samson et al. | 83/865 |
| 4,704,959 | 11/1987 | Scallen | 99/538 |
| 4,926,726 | 5/1990 | Julian | 83/356.3 X |
| 4,979,418 | 12/1990 | Covert et al. | 83/865 |

*Primary Examiner*—Douglas D. Watts
*Assistant Examiner*—Rinaldi Rada
*Attorney, Agent, or Firm*—Limbach & Limbach

[57] ABSTRACT

An apparatus for producing helical slices of an object, such as a potato. The apparatus includes a rotatably mounted knife assembly having one or more sets of knife blades arranged in a spiral pattern. Each set of knife blades produces a set of helically shaped potato slices. The spiral arrangement of each blade set reduces the torque needed to slice an object using the knife assembly. In a preferred embodiment, the inventive apparatus includes two sets of slicing blades, for producing two sets of intertwined helical product slices. A curved separator tube, which extends downward from the slicing blade area, disentangles the pair of intertwined slices having the smallest radius, as the blade assembly and the separator tube rotates as a unit.

10 Claims, 10 Drawing Sheets

APPARATUS FOR PRODUCING HELICAL SLICES

CROSS-REFERENCE TO RELATED APPLICATION

The present application is a continuation-in-part of U.S. patent application Ser. No. 07/672,037, filed Mar. 19, 1991, now abandoned.

FIELD OF THE INVENTION

The invention relates to an apparatus for slicing objects, such as potatoes, into helical or spiral-shaped portions.

BACKGROUND OF THE INVENTION

A variety of food processing systems have been developed for slicing food items into helical or spiral-shaped portions. For example, U.S. Pat. No. 4,926,726, to Julian, issued May 22, 1990, and U.S. Pat. No. 4,979,418 to Covert, et al., issued Dec. 25, 1990, both disclose an apparatus for cutting food items, such as potatoes, into helical portions. The apparatus of each of these patents transports potatoes between a set of top, bottom, and side conveyors to a set of spring biased feed rollers 150, 151, and 152. Each potato is then translated horizontally between the feed rollers into contact with a rotating knife assembly 12. The knife assembly has two radially oriented rows of horizontally protruding knife blades 180 for scoring the potato, and a vertically oriented blade 182 for severing helical slices from the scored potato. The knife assembly of U.S. Pat. No. 4,979,418 (and of a first embodiment disclosed in U.S. Pat. No. 4,926,726) is driven by drive gear 188 which engages the knife assembly's drive teeth 231 (shown in FIG. 11 of U.S. Pat. No. 4,926,726). In a second embodiment disclosed in U.S. Pat. No. 4,926,726, the knife assembly is driven by drive belt 360 (shown in FIG. 13), which engages teeth 320 of knife assembly member 316.

The present invention is an improved apparatus for producing helical slices of an object, which includes an improved knife assembly drive means employing water to cool and clean its bearings, an improved knife assembly having knife blades arranged in a spiral pattern to reduce the torque needed to slice objects, and an improved, vertically oriented feed roller and feed chain assembly for translating objects into contact with the knife assembly.

SUMMARY OF THE INVENTION

The invention is an apparatus for producing helical slices of an object. Although the invention is suitable for slicing a wide variety of objects, potatoes are an important example of an object that can be sliced in accordance with the invention. For convenience, the specification will describe the invention in the context of slicing potatoes, although the claimed invention is not limited to a method or apparatus for slicing potatoes.

The apparatus of the invention includes a rotatably mounted knife assembly having one or more sets of knife blades arranged in a spiral pattern. Each set of knife blades produces a set of helically shaped potato slices. The spiral arrangement of each blade set reduces the torque needed to slice a potato using the inventive knife assembly.

The arrangement of scoring and slicing blades in the inventive apparatus produces helical slices in a single, continuous cutting action, rather than by a scoring cutting action followed by a subsequent slicing action to produce helical slices, as in conventional devices such as those described in above-discussed U.S. Pat. Nos. 4,926,726 and 4,979,418.

In a class of preferred embodiments, the invention includes two sets of slicing blades, for producing two sets of intertwined helical product slices. A curved separator tube, which extends downward from the slicing blade area, disentangles the pair of intertwined slices having the smallest radius, as the blade assembly and the separator tube rotates as a unit.

DETAILED DESCRIPTION OF THE PREFERRED EMBODIMENT

A first preferred embodiment of the inventive apparatus will be described with reference to FIGS. 1 through 15.

Figure 1:
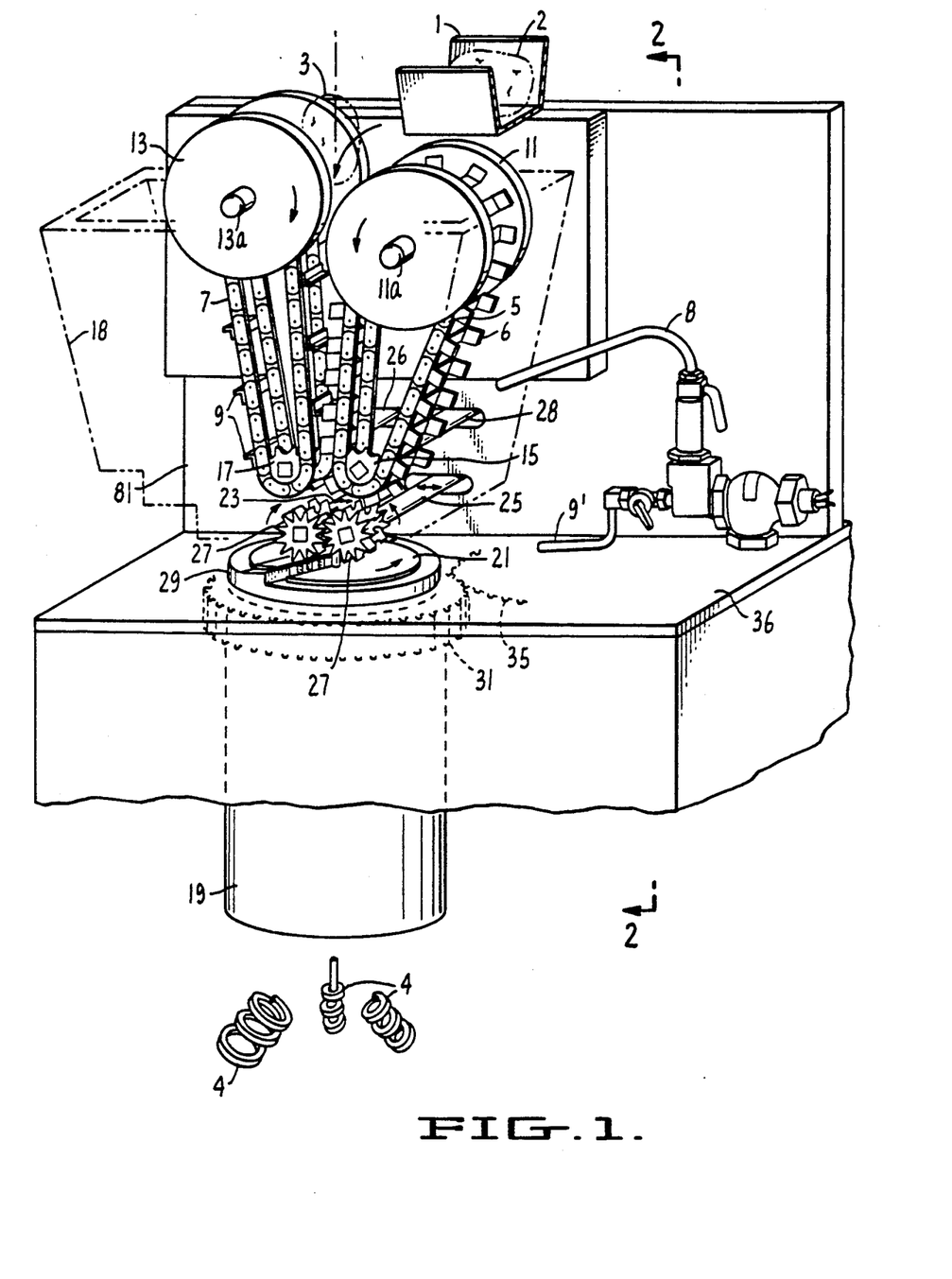
FIG. 1 is a perspective view of a preferred embodiment of the apparatus of the invention.

As indicated in FIG. 1, the apparatus produces helical slices (such as slices 4) from objects (such as potato 2 on shaker table 1, and potato 3 shown falling between feed chain 5 and gripper chain 7). As unsliced potatoes fall from shaker table 1 they are guided into the space between feed chain 5 and gripper chain 7 by spindles 11 and 13, each potato is gripped by chains 5 and 7 and conveyed downward to set of feed rolls 27. Feed chain 5 is mounted around spindle 11 and drive sprocket 15, and gripper chain 7 is mounted around spindle 13 and drive sprocket 17. As sprockets 15 and 17 rotate, chain 5 rotates counterclockwise (forcing spindle 11 to rotate about axle 11a in the direction shown) and chain 7 rotates clockwise (forcing spindle 13 to rotate about axle 13a in the direction shown). Spindle 13 preferably has a smaller radius than spindle 11, and spindles 11 and 13 are both preferably composed of durable plastic. The centerline of spindle 13 is offset vertically above the centerline of spindle 11, so that spindles 11 and 13 act together to divert potatoes 2 from a generally horizontal path to a vertical downward path between chains 5 and 7.

As each potato is conveyed downward between chains 5 and 7, it is constrained by one of cleats 9 of gripper chain 7 and aligned by guides 6 of feed chain 5, so that it reaches feed rolls 27 in a generally vertical alignment (with its long axis oriented generally vertically).

Figure 2:
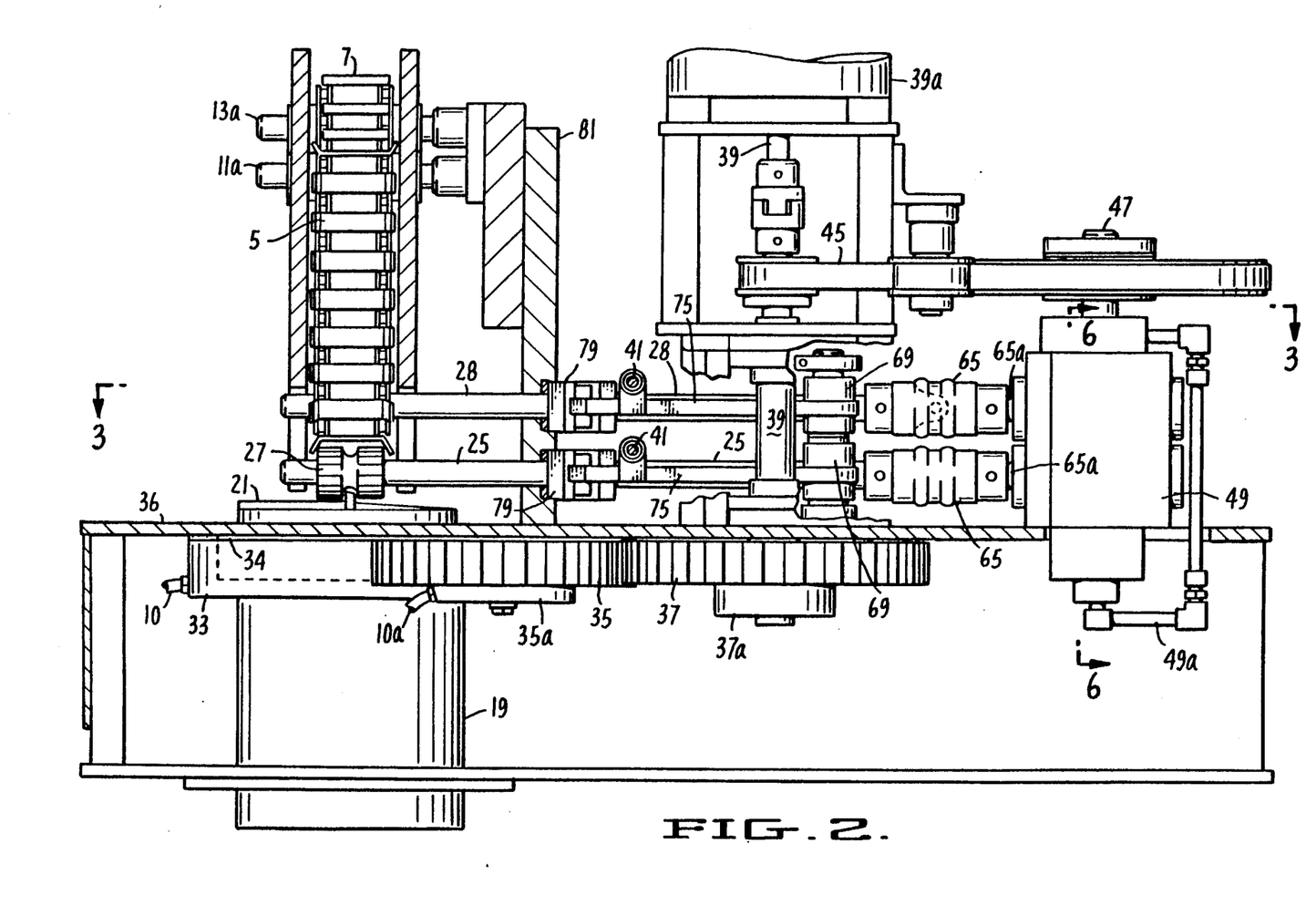
FIG. 2 is a cross-sectional view of the FIG. 1 apparatus, taken along line 2—2.
Figure 3:
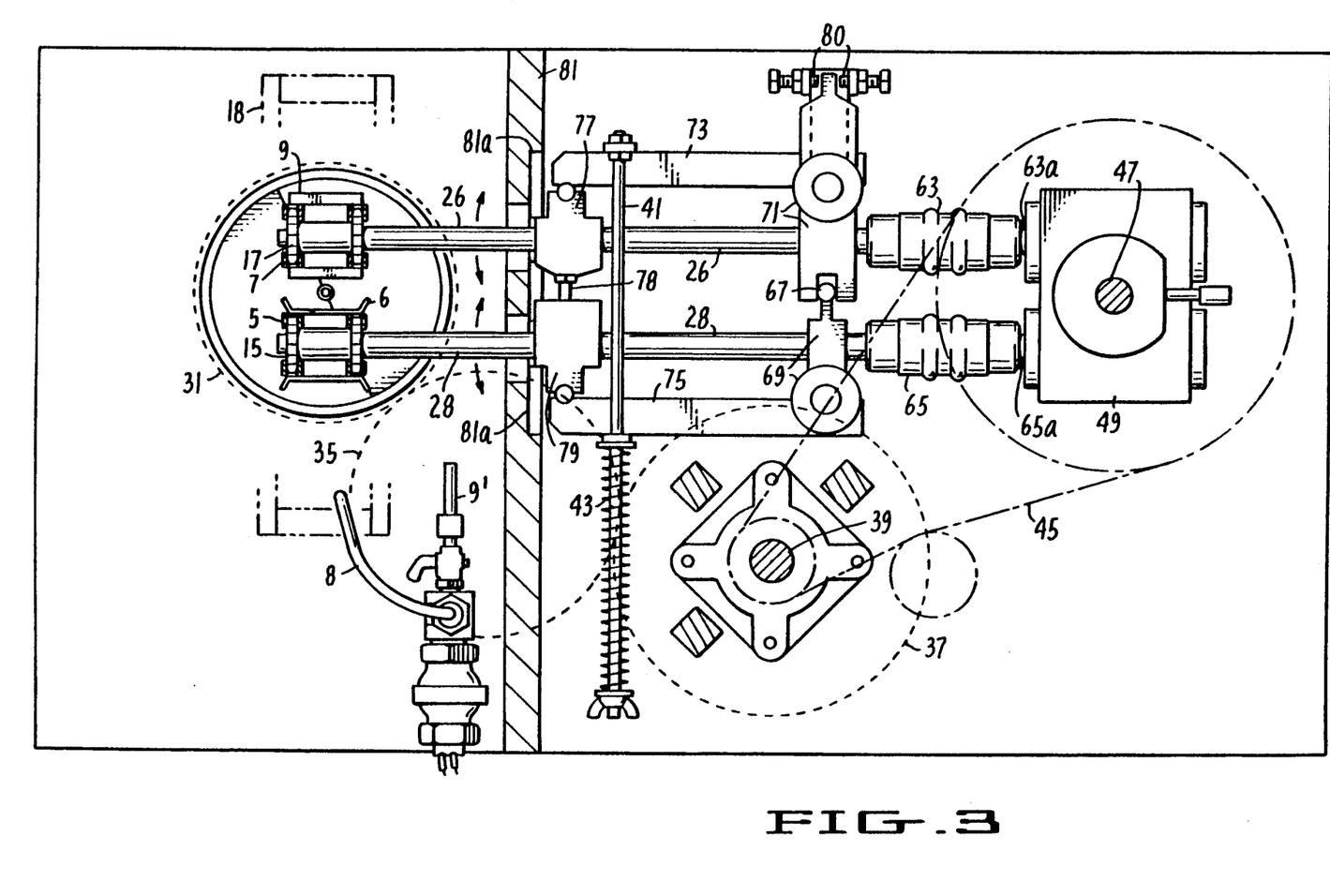
FIG. 3 is a cross-sectional view of the FIG. 2 apparatus, taken along line 3—3.

Feed rolls 27 are mounted at the ends of rotatable shafts 23 and 25, sprocket 15 is mounted at the end of rotatable shaft 28, and sprocket 17 is mounted at the end of rotatable shaft 26 (shown in FIG. 3, but not in FIG. 1). Each of shafts 23, 25, 26, and 28 is mounted (in a manner to be described below with reference to FIGS. 2, 3, and 6) with freedom to move horizontally. This freedom to move horizontally permits sprockets 15 and 17 (and rolls 27) to be displaced away from each other when necessary to allow large potatoes to pass between them.

Figures 4, 5, 6:
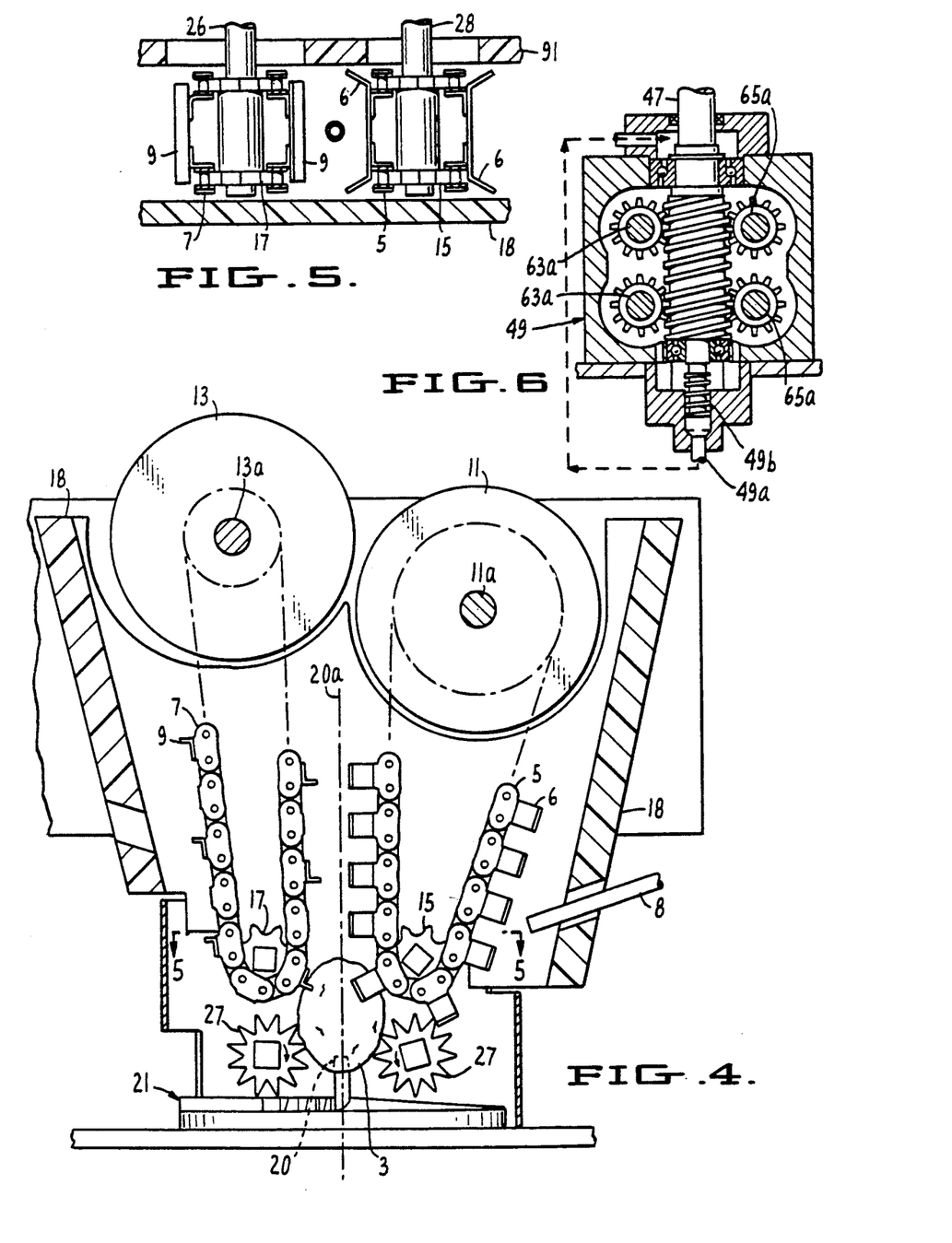
FIG. 4 is a front cross-sectional view of the product feed assembly of the FIG. 1 apparatus.
FIG. 5 is a cross-sectional view of a portion of the FIG. 4 apparatus, taken along line 5—5 of FIG. 4.
FIG. 6 is a is a cross-sectional view of a gear box portion of the FIG. 2 apparatus, taken along line 6—6 of FIG. 2.
Figures 11, 12, 13:
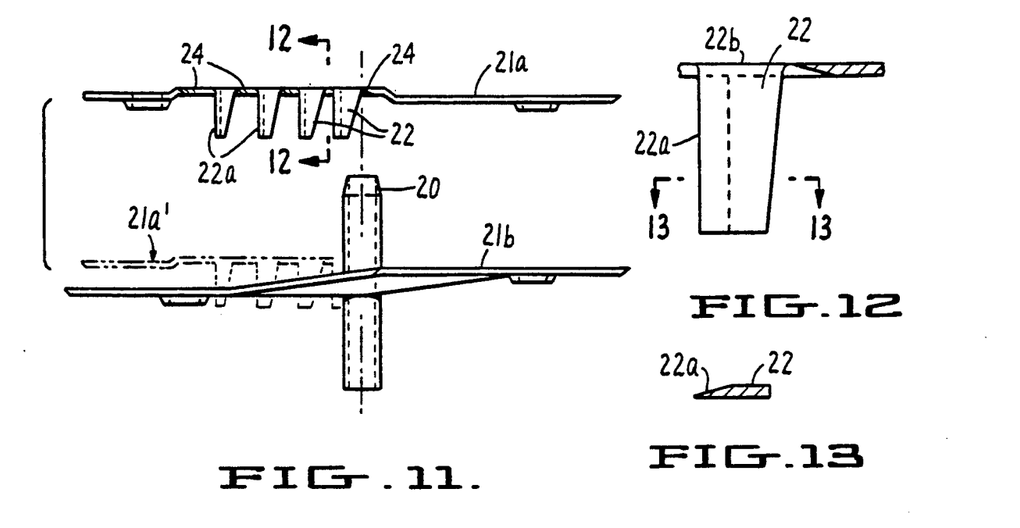
FIG. 11 is an exploded side view of a portion of the knife assembly of FIG. 9.
FIG. 12 is a cross-sectional view of a knife portion of the FIG. 11 apparatus, taken along line 12—12 of FIG. 11.
FIG. 13 is a cross-sectional view of the knife of FIG. 12, taken along line 13—13 of FIG. 12.

As shafts 23 and 25 rotate feed rolls 27 in the directions shown in FIG. 11, the teeth of feed rolls 27 grip each potato and force the potato vertically against knife 21. Knife 21 rotates in a horizontal plane to slice each potato forced against it by feed rolls 27. Preferably, the teeth of feed rolls 27 have a triangular cross-section (as shown in FIG. 4). Such a triangular cross-section, in combination with a clearance slot in the center portion of each feed roll (best shown in FIG. 2), allows feed rolls 27 to be positioned in very close proximity (i.e., one-sixteenth of an inch or less) to slicing knife 21.

Knife 21 is mounted on knife carrier 29, which is attached to bearing 31. The outer cylindrical surface of bearing 31 has teeth, which engage corresponding teeth of idler gear 35. Bearing 31, gear 35, and the other components of the inventive apparatus for driving knife 21, will be described in detail below with reference to FIGS. 2, 3, 7, and 8.

Helical slices 4 produced by rotating knife 21 fall downward through chute 19. Chute 19 is rigidly mounted to frame 36 and its inner diameter is such that it adds a slight drag to the cut helical slices as they disengage from rotating knife 22. This drag against chute or tube 19 will stop the uncut end portion from spinning and breaking off after disengaging feed rolls 27. The result is a completely cut potato. The falling slices can be collected in a bin or conveyor belt (not shown in FIG. 1). Housing 18 (which is shown in phantom view in FIG. 1) is removably mounted around the feed assembly of the apparatus (chains 5 and 7 and feed rolls 27) to prevent potato slices from escaping from the area, and to prevent contaminants from reaching the knife area during slicing operations.

Water line 8 directs a stream of water to the area of sprockets 15 and 17, and feed rolls 27, and water line 9' directs a stream of water to the area of knife 21, to rinse the components in these respective areas when desired. As best shown in FIG. 4, housing 18 has a channel extending through its sidewall through which water line 8 can be inserted. Additional water lines 10 and 10a, shown in FIGS. 2 and 7 but not in FIG. 1, supply water to cool and flush gear idler 35 and knife bearing 31 (in a manner to be explained in greater detail below with reference to FIGS. 2 and 7).

The means for driving sprockets 15 and 17, and feed rolls 27, will next be described with reference to FIGS. 2, 3, and 6. Vertically oriented shaft 47 within gear box 49 is rotated about its vertical axis by drive belt 45, which is looped around drive shaft 39. Gear box 49 (best shown in FIG. 6) includes worm gears for translating the vertical rotation of shaft 47 into counterclockwise rotation of shafts 63a and clockwise rotation of shafts 65a. Lubricating oil flows downward through gear box 49, and is forced by pumping screw 49b to recirculate back to the top of gear box 49 through oil line 49a.

Upper and lower shafts 65a are connected to upper and lower universal joint couplers 65 (shown in FIG. 2), and upper and lower shafts 63a are connected to upper and lower universal joint couplers 63 (upper coupler 63 is shown in FIG. 3).

Upper and lower couplers 65 are connected, respectively, to shafts 28 and 25. Upper and lower couplers 63 are connected, respectively, to shafts 26 and 23. Shafts 28 and 25 are supported by adjustable upper and lower slide blocks 79. Shafts 26 and 23 are supported by upper and lower slide blocks 77.

Each of couplers 63 and 65 transmits rotational motion from one shaft connected thereto to the other shaft connected thereto. The inventive apparatus is designed so that shafts 23, 25, 26, and 28 are mounted with freedom to pivot toward each other or away from each other in a horizontal plane (i.e., in the direction of the arrows shown adjacent shafts 26 and 28 in FIG. 3, and in the direction of the arrows shown adjacent shafts 23 and 25 in FIG. 1) while they rotate.

With reference to FIG. 3, mounting member 69 is rigidly connected to shaft 28 and to one end of rigid member 75, and mounting member 71 is rigidly connected to shaft 26 and to one end of rigid member 73. Members 69 and 71 are connected together by pivot 67, so that the assembly comprising shaft 26 and members 71 and 73 is free to pivot in a horizontal plane about pivot 67, with respect to the assembly comprising shaft 28 and members 69 and 75.

A second end of member 73 is attached to slide block 77, and a second end of member 75 is attached to adjustable slide block 79. An adjustable screw 78 is attached to each block 79 to limit the minimum distance between that block 79 and the adjacent slide block 77. Each pair of adjacent slide blocks 77 and 79 is free to slide toward (and away from) each other along the axis of screw 78 as shafts 26 and 28 pivot, while at the same time shafts 26 and 28 rotate about their respective axes relative to the slide blocks 77 and 79.

Vertically oriented slide plate 81 (shown in FIGS. 1, 2, and 3) separates the knife and feed assemblies from the drive assembly. Slide plate 81 (which is preferably made of durable plastic) has four horizontally oriented linear openings 81a (one for each of the upper and lower slide blocks 77 and the upper and lower slide blocks 79). Shafts 23, 25, 26, and 28 extend through the openings 81a, and slide blocks 77 and 79 slide along the openings 81a. Openings 81a thus function as linear tracks which constrain the slide blocks to translate along horizontal linear paths. Slide plate 81 also prevents product fragments from the knife area from contaminating the drive assembly.

One end of rigid shaft 41 is connected to member 73, and spring 43 is compressed between member 75 and the other end of shaft 41. Spring 43 thus biases members 73 and 75 together. When shafts 26 and 28 are forced apart (for example, by a potato passing between them), the outward force exerted on members 73 and 75 by the outward sliding slide blocks 77 and 79 will further compress spring 43. Then, after the potato has moved out from between shafts 26 and 28, spring 43 will relax back to its original length. As spring 43 relaxes to its original length, it causes members 73 and 75 to push slide blocks 77 and 79 together and to rotate members 69 and 71 about pivot 67 back to their original positions.

Couplers 63 and 65 are capable of flexing in a horizontal plane to accommodate pivoting motion of shafts 26 and 28 with respect to fixedly mounted gear box 49.

Adjustable screws 80 limit the pivoting motion of member 71. Screws 80 can be independently advanced or retracted to control the angular range through which member 71 is free to pivot.

The apparatus includes two identical shaft drive assemblies, but only the upper assembly (for driving shafts 26 and 28) is visible in FIG. 3. The lower assembly (for driving shafts 23 and 25) includes a lower adjustable slide block 79 (shown in FIG. 2), a lower slide block 77 (positioned below upper slide block 77 of FIG. 3), shafts 25 and 23 (positioned, respectively, below shaft 28 and shaft 26 of FIG. 3), and a second assembly comprising couplers 69 and 71, slide blocks 77 and 79, members 73 and 75, shaft 41, spring 43, and screws 80 (positioned below the corresponding assembly shown in FIG. 3, and partially visible in FIG. 2). The lower assembly operates in the same way as does the upper assembly described with reference to FIG. 3, so that a potato passing between shafts 23 and 25 will temporarily displace the shafts (thereby compressing spring 43), and then (after the potato has been sliced by knife 21) spring 43 will urge shafts 23 and 25 back to their original positions as spring 43 relaxes back to its original length.

Figures 7, 8:
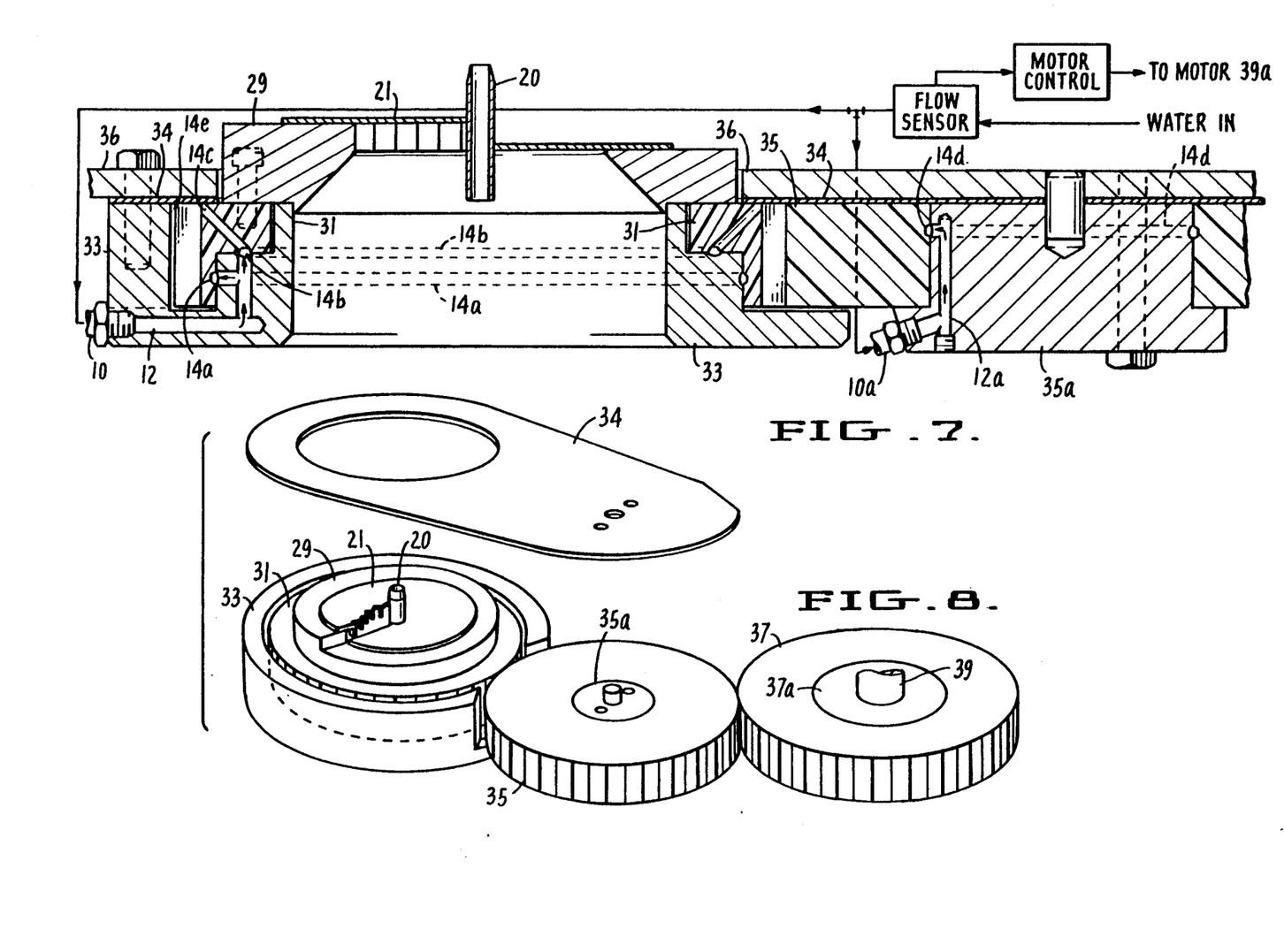
FIG. 7 is a side cross-sectional view of a portion of the FIG. 1 apparatus.
FIG. 8 is an exploded perspective view of gear components of the FIG. 1 apparatus.

The means for driving the knife assembly of the invention will next be described with reference to FIGS. 2, 3, 7, and 8. As shown in FIGS. 7 and 8, wear shim 34 (preferably made of stainless steel), bearing housing 33, and idler gear mount 35a, are fixedly attached to frame 36. Knife 21 is fixedly attached to knife carrier 29, and knife carrier 29 is fixedly attached to knife bearing 31. The assembly comprising knife 21, carrier 29, and bearing 31 is rotatably mounted within bearing housing 33, so that it is free to rotate as a unit with respect to fixedly mounted housing 33. Bearing 31 is preferably made of durable plastic (such as UHMW plastic), and housing 33 is preferably made of bronze.

Idler gear 35 is rotatably attached to idler gear mount 35a. Teeth protrude from the outer, generally cylindrical, surface of knife bearing 31. These teeth engage corresponding teeth which protrude from the outer, generally cylindrical, surface of idler gear 35.

As shown in FIG. 2, drive gear mount 37a is fixedly attached to drive shaft 39, and drive gear 37 is fixedly mounted to member 37a. Gear teeth dimensioned to engage the teeth of idler gear 35 protrude from the outer surface of drive gear 37. Drive shaft 39 extends between motor 39a and drive gear 37, and is rotatably mounted to frame 36. When motor 39a rotates shaft 39, shaft 39 not only rotates belt 45 (to cause shaft 47 to rotate) but also rotates drive gear 37. The rotational motion of gear 37 is transmitted through gear 35 to bearing 31 (to cause knife 21 to rotate).

A user of the inventive apparatus can control the thickness of the helical slices produced, by varying the rate at which shaft 47 rotates (and hence the rate at which potatoes are fed by feed rolls 27 to the knife assembly), or changing the rate at which gear 35 drives the knife bearing 31 (for example, by replacing gear 35 or gear 37 with a substitute gear), or both.

With reference to FIG. 7, channel 12 extends through bearing housing 33, and channel 12a extends through idler gear mount 35a. Channel 12 has an inlet for receiving water (or some other flushing liquid) from water line 10, and channel 12a has an inlet for receiving water (or some other flushing liquid) from water line 10a (line 10a can be a branch line connected to line 10).

Channel 12 has annular outlets 14a and 14b (or, alternatively, a series of pinhole outlets arranged along annulus 14a and along annulus 14b). Thus, a flushing liquid can flow (in the direction of the arrows shown in FIG. 7 in channel 12) from water line 10, through channel 12, and out from outlets 14a and 14b into the space between stationary bearing housing 33 and rotatable knife bearing 31.

A channel 14c also extends through bearing 31, so that a flushing liquid (such as water) can flow from outlet 14b, through channel 14c, into region 14e between stationary bearing housing 33 and rotatable bearing 31. The liquid flowing out from outlets 14a and 14b (and the outlet of channel 14c) serves to flush contaminants (such as starchy potato fragments) from between bearing 31 and housing 33 and from between bearing 31 and gear 35, and to cool and reduce wear on bearing 31.

Channel 12a also has annular outlet 14d, so that a flushing liquid (such as water) can flow (in the direction of the arrows shown in channel 12a) from water line 10a, through channel 12a, and out from outlet 14d into the space between stationary gear mount 35a and rotatable gear 35. The liquid flowing out from outlet 14d serves to flush contaminants from between mount 35a and gear 35 and from between bearing 31 and gear 35, and to cool and reduce wear on bearing 31 and gear 35.

As indicated schematically in FIG. 7, the flow of liquid within lines 10 and 10a is preferably monitored by a flow sensor. A motor control switch is also provided. The motor control switch can be manually operable. However, in a preferred embodiment, the motor control switch can be switched off automatically in response to a control signal from the flow sensor. For example, when the flow sensor detects inadequate flow of fluid through lines 10 and 10a, it sends a signal to the motor control switch, to cause the motor control switch to shut off motor 39a.

Figure 9:
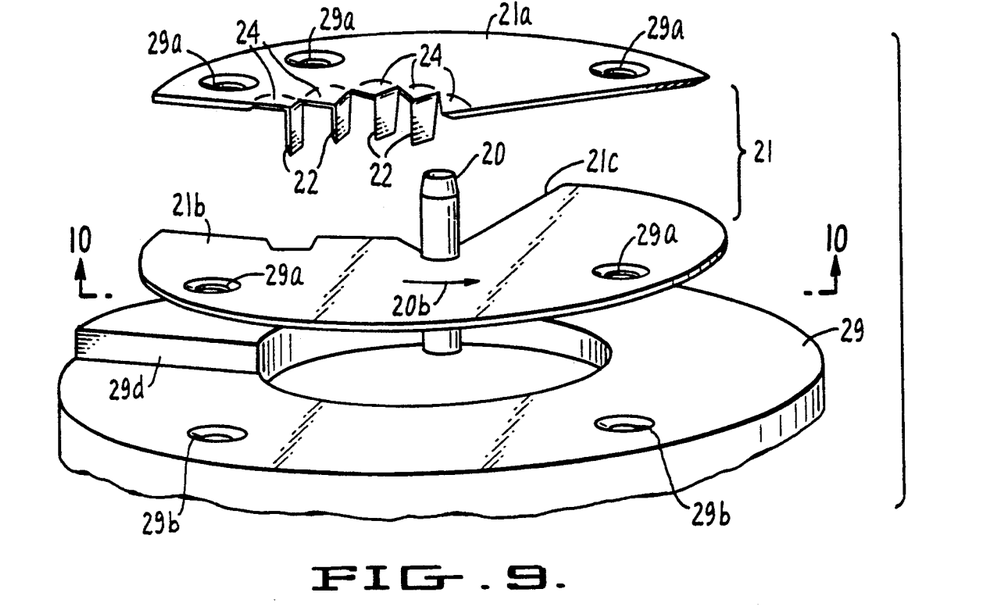
FIG. 9 is an exploded perspective view of the knife assembly of the FIG. 1 apparatus.
Figure 10:
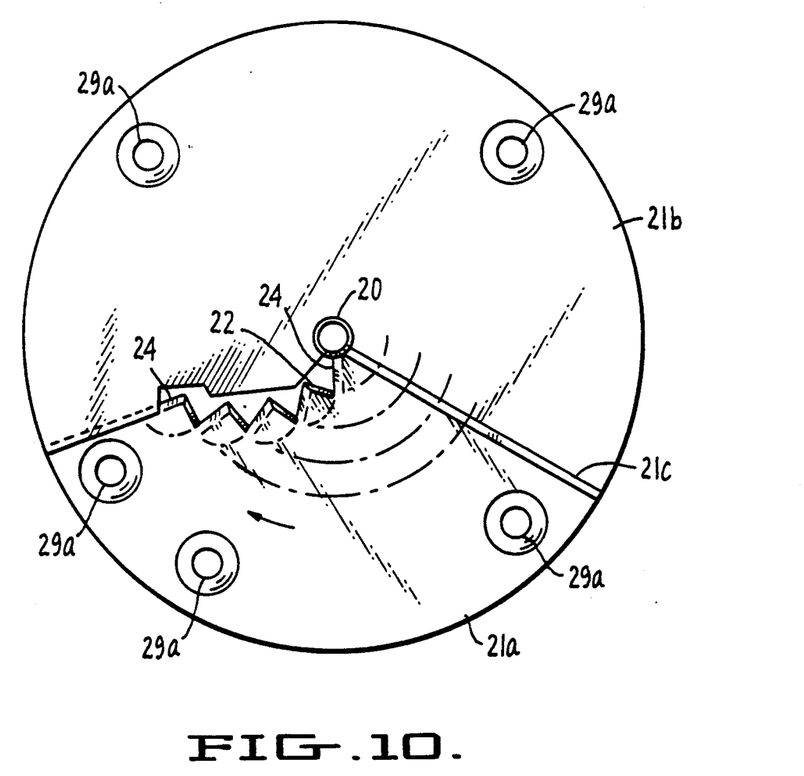
FIG. 10 is a cross-sectional view of the assembled FIG. 9 assembly, taken along line 10—10 of FIG. 9.

A preferred embodiment of the inventive knife assembly will next be described with reference to FIGS. 4, and 9 through 15. As shown in FIGS. 9 and 10, knife 21 comprises knife sections 21a and 21b. Knife sections 21a and 21b are fixedly attached to knife carrier 29, such as by screws inserted into holes 29a (of sections 21a and 21b) and holes 29b of carrier 29 (when holes 29b are aligned with holes 29a).

Knife section 21b includes central cylindrical blade 20. Knife 21 and carrier 29 are mounted so that the axis of blade 20 is aligned with vertical axis 20a (shown in FIG. 4). As feed rolls 27 push potato 3 downward along axis 20a, blade 20 of the rotating knife assembly impales the potato, and severs the central cylindrical core portion from the remainder of the potato.

Knife section 21a includes a set of blades, which consists of vertical blades 22 and horizontal blades 24. As the knife assembly rotates in a counterclockwise direction (the direction indicated by arrow 20b of FIG. 9) and rolls 27 feed a potato against knife sections 21a and 21b, blades 22 and 24 sever helical slices from the potato in a single, simultaneous cutting action. In conventional potato slicing devices, the end of the potato is scored by a set of scoring blades during a first cutting action, and then helical slices are cut away from the scored potato by a separate slicing blade in a second, subsequent cutting action.

As shown in FIG. 9, the upper surface of knife carrier 29 is not flat, but instead has a ramped profile. Vertical shoulder 29d of carrier 29 separates the lowest and highest portions of carrier 29's ramped surface. As shown in FIG. 11, knife section 21b has an upper portion (adjacent edge 21b) and a lower portion (opposite edge 21b), and knife section 21a has an upper portion (including blades 22 and 24) and a lower portion (opposite blades 22 and 24). When sections 21a and 21b are mounted on carrier 29, section 21a occupies position 21a' (shown in phantom view in FIG. 11) in relation to section 21b. With sections 21a and 21b so mounted on carrier 29, the upper portion of section 21b meets the lower portion of section 21a (with beveled edge 21c of section 21b protruding slightly below the adjacent trailing edge of section 21a), but blades 24 (of the upper portion of section 21a) are exposed above the lower portion of section 21b.

FIG. 10 is a view from below of assembled knife sections 21a and 21b. With reference to FIGS. 9 and 10, it will be appreciated that as knife 21 rotates (in a clockwise direction in FIG. 10), knife section 21a rotates above the potato slices that have been severed by blades 22 and 24, while the unsliced potato portion presses downward against the upper surface of section 21a.

Figures 14, 15:
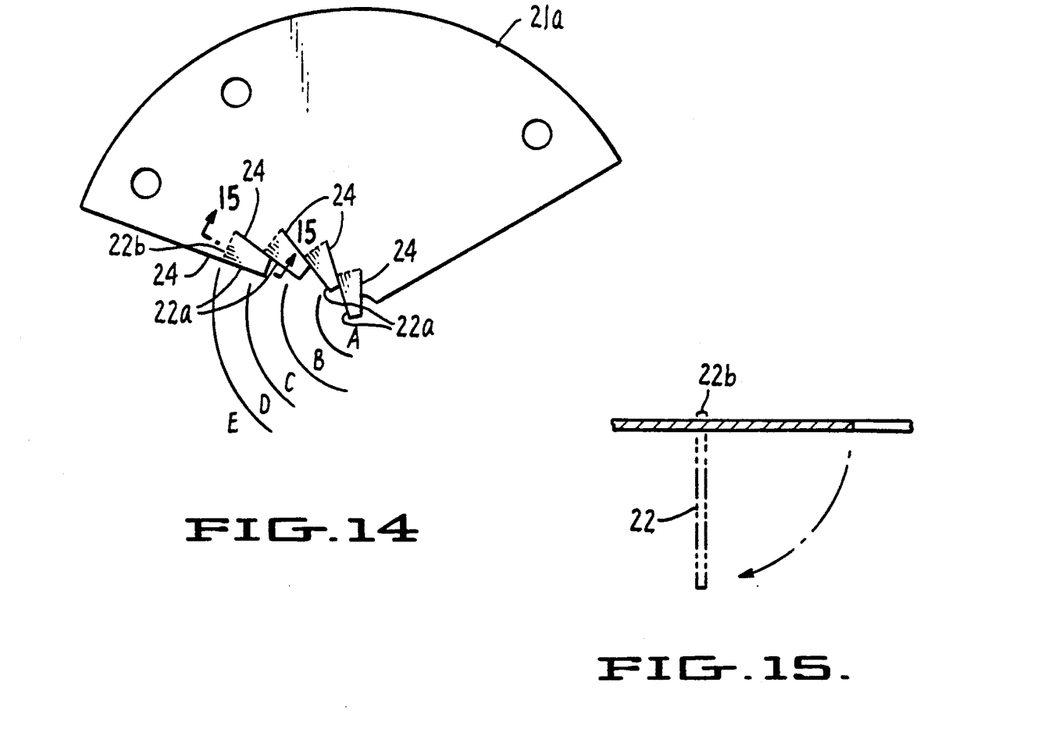
FIG. 14 is a top view of a portion of the FIG. 11 apparatus.
FIG. 15 is a side view of a portion of a knife template, of a type which can be processed (by bending and sharpening) to produce the knife component shown in FIG. 14.

As shown in FIGS. 11, 12, and 13, each of the four vertical blades 22 has a sharpened leading edge 22a. The first step in a preferred technique for manufacturing blades 22 is to produce an appropriately shaped flat template (a portion of which is shown in FIG. 15) for knife section 21a. Then, in order to form each blade 22, a portion of the template is bent along a hinge segment 22b (for example, into the position of blade 22 shown in phantom view in FIG. 15). Finally, sharp edges 22a and blades 24 are produced by sharpening desired portions of the leading edge of knife section 21a.

As shown in FIG. 14 (which is a top view of knife section 21a) and FIG. 9, blades 22 and corresponding blades 24 are arranged in a spiral (or "curvilinear") pattern. Thus, the innermost blade 24 coincides with a first radius of the knife assembly, and each other blade 24 coincides with a different knife assembly radius. The midpoint of each of vertical edges 22a also coincides with a different knife assembly radius.

Rotating knife 21 is capable of producing as many as five helical potato slices, each having a different radius, and each corresponding to one of regions A, B, C, D, and E of FIG. 14. Less than five helical slices would be produced from a potato having radius less than the radius of region D. Each of blades 22. In addition to such helical slices, central cylindrical blade 20 produces a cylindrical slice (the potato core portion that is severed by, and pushed through, central blade 20).

The spiral pattern of blades 22 (and the spiral pattern of blades 24) reduces the torque that the inventive apparatus must generate to slice each potato. This can be understood by recognizing that the outermost blade 22 and the outermost blade 24 (the two blades farthest from central knife 20) sever the outermost helical portion of each potato before the other blades engage the potato. Thus, the entire force exerted by knife 21 on the potato (during the initial phase of each helical slicing operation) is exerted by the outermost pair of blades only; not simultaneously by all blades 22 and 24. Indeed, no pair of adjacent blades 22 and 24 engages the potato until after all blades 22 and 24 outside such pair have severed portions of the potato.

Although the FIG. 14 embodiment has four vertical blades 22 and five horizontal blades 24, it is contemplated that alternative embodiments of knife section 21a may include more (or less) than four curvilinearly arranged vertical blades 22, and more (or less) than five curvilinearly arranged horizontal blades 24.

Knife 51 of FIGS. 16-19 is a variation on knife 21 of FIGS. 9-15, having two identical sets of blades which produce two identical sets of helical slices (unlike knife 21, which produces only one set of helical slices). Knife 51 is dimensioned to be mounted on knife carrier 29' and carrier 29' is dimensioned to serve as a substitute for knife carrier 29 of FIGS. 1-10.

Figure 16:
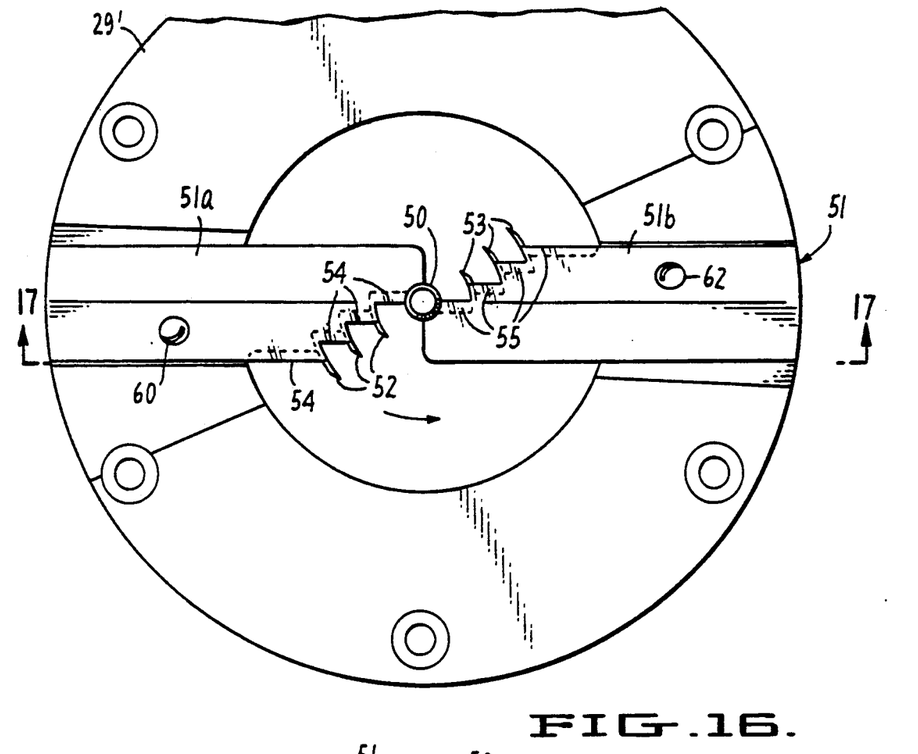
FIG. 16 is a top view of an alternative preferred embodiment of a knife assembly, suitable for mounting in the FIG. 1 apparatus.

Knife 51 consists of central coring blade 50, and identical blade pieces 51a and 51b rigidly connected to central blade 50. Blade piece 51a is attached to knife carrier 29' by screw 60, or the like, and blade piece 51b is attached to knife carrier 29' by screw 62, or the like.

Knife 51 and carrier 29' are mounted so that the axis of blade 50 is aligned vertically (as is the axis of blade 20 in FIG. 4). As the feed rolls push a potato downward against rotating knife 51, blade 50 impales the potato and severs the potato's central cylindrical core portion from the remainder of the potato.

Blade piece 51a includes three vertical blades 52 and four horizontal blades 54, and blade piece 51b includes three vertical blades 53 and four horizontal blades 55. As the knife assembly of FIG. 16 rotates in a counterclockwise direction and the feed rolls feed a potato against pieces 51a and 51b, blades 52 and 54 sever a first set of up to four helical (spiral-shaped) slices from the potato.

Each helical slice in the first set has a different radius, with each radius corresponding to the radial distance between the center of blade 50 the midpoint of the blade 54 which severed the slice. Also while the knife assembly of FIG. 16 rotates, blades 53 and 55 sever a second set of up to four helical slices from the potato. Each helical slice in the second set has a radius matching that of one of the helical slices in the first set. The first and second sets of slices are intertwined, so that the loops of each slice in the first set occupy the spaces between the loops of a corresponding slice in the second set.

The severed potato slices fall downward through the volume beneath inner inclined surface 30' of carrier 29' into a chute (such as chute 19 of FIG. 1). Preferably, a means (not shown) is mounted within (or below) the chute to disentangle the intertwined loops of the first and second sets of helical slices as they fall from the FIG. 16 knife assembly.

Figure 17:
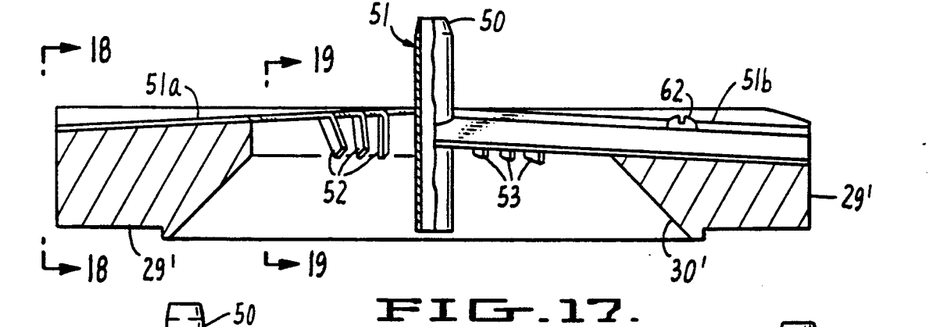
FIG. 17 is a cross-sectional view of the FIG. 16 assembly, taken along line 17—17 of FIG. 16.
Figure 18:
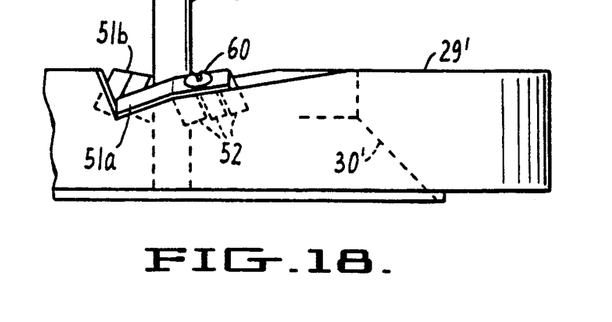
FIG. 18 is a cross-sectional view of a portion of the FIG. 16 assembly, taken along line 18—18 of FIG. 17.
Figure 19:
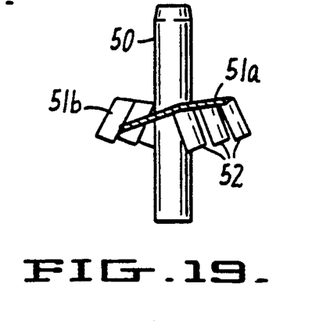
FIG. 19 is a cross-sectional view of a portion the FIG. 16 assembly, taken along line 19—19 of FIG. 17.

As shown in FIG. 17, the upper surface of knife carrier 29' is inclined (its elevation decreases with increasing radial distance from central blade 50). Thus, each of the outermost blades 52, 53, 54, and 55 is lower than the corresponding innermost ones of blades 52, 53, 54, and 55 (as shown in FIGS. 17-19). Blades 52 and 54 are curvilinearly arranged, so that the outermost pair of adjacent blades 52 and 54 of rotating knife 51 will engage the potato before the innermost pair of adjacent blades 52 and 54, thus reducing the torque needed to slice the potato. Similarly, blades 53 and 55 are curvilinearly arranged, so that the outermost pair of adjacent blades 53 and 55 of rotating knife 51 will engage the potato before the innermost pair of adjacent blades 53 and 55.

Knife 81 of FIGS. 20, 21, 23, and 24, is also a variation on knife 21 of FIGS. 9-15, and also has two identical sets of blades which produce two identical sets of helical slices (unlike knife 21, which produces only one set of helical slices). Knife 81 is dimensioned to be mounted on knife carrier 129 and carrier 129 is dimensioned to serve as a substitute for knife carrier 29 of FIGS. 1-10.

Figures 20, 21, 22:
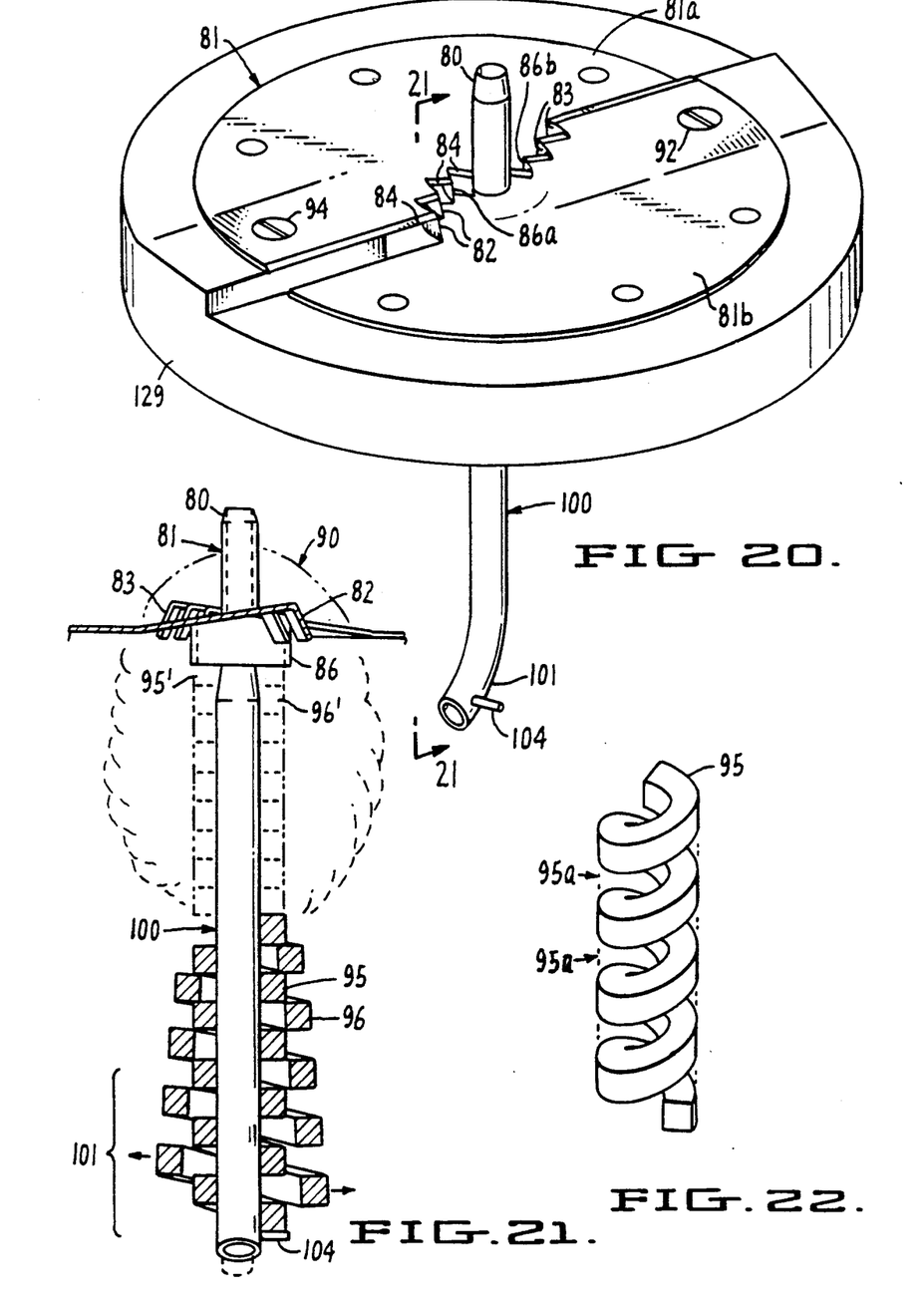
FIG. 20 is a perspective view of another alternative preferred embodiment of a knife assembly, suitable for mounting in the FIG. 1 apparatus.
FIG. 21 is a cross-sectional view of a portion of FIG. 20 assembly, engaged with a potato.
FIG. 22 is a perspective view of a helical slice of the type that can be produced using the FIG. 20 assembly.

Knife 81 consists of central coring blade 80, identical blade pieces 81a and 81b (rigidly connected to coring blade 80), knife-edged support tube 86 (rigidly connected to blade pieces 81a and 81b), and separator tube 100 (rigidly connected to coring blade 80). Blade piece 81a is attached to knife carrier 129 by screw 94, or the like, and blade piece 81b is attached to knife carrier 129 by screw 92, or the like.

Figure 23:
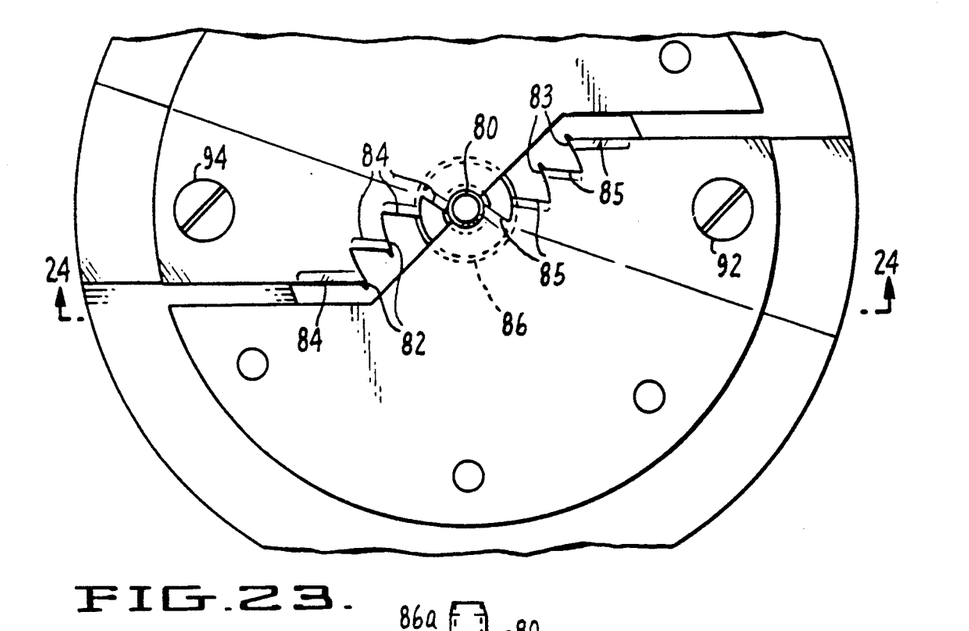
FIG. 23 is a top view of a portion of the FIG. 20 assembly.

Knife 81 and carrier 129 are mounted so that the axis of blade 80 is aligned vertically (as is the axis of blade 20 in FIG. 4). As the feed rolls push a potato downward against rotating knife 81, blade 80 impales the potato and severs the potato's central cylindrical core portion from the remainder of the potato. As best shown in FIG. 23, separator tube 100 is coaxially aligned with (and connected to) blade 80. The potato's central cylindrical core portion is pushed downward through the channel which extends through blade 80 and tube 100, until the core portion emerges from the lower end of tube 100.

Figure 24:
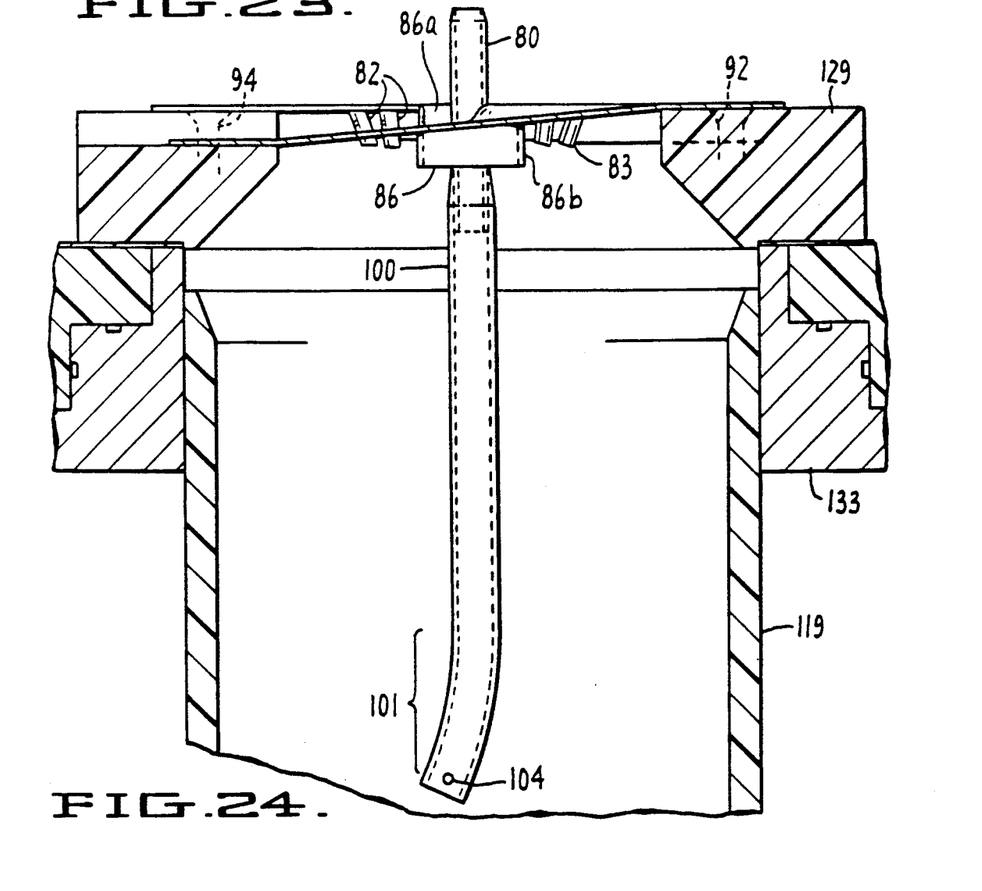
FIG. 24 is a cross-sectional view of a portion of the FIG. 23 assembly, taken along line 24—24 of FIG. 23.

As shown in FIG. 24, knife carrier 129 rotates relative to fixed housing 133. Chute 119 is attached to housing 133. Chute 119 confines the potato's core portion, and helical slices of the potato (to be described below), as these potato fragments fall away from the rotating assembly comprising knife 81 and carrier 129.

Blade piece 81a includes two vertical blades 82 and four horizontal blades 84, and blade piece 81b includes two vertical blades 83 and four horizontal blades 85. Support tube 86 has sharpened, vertically oriented, knife blade portions 86a and 86b. As knife 81 rotates about the axis of blade 80, each set of blades 84 and 85 produces a helical potato slice from a potato 90 (shown in FIG. 21). At the same time, blades 86a and 82 divide the helical slice produced by blades 84 into a first set of four (or less) helical portions (each having a different radius), and blades 86b and 83 divide the helical slice produced by blades 85 into a second set of four (or less) helical portions (each having a different radius).

The radius of each helical slice in the first (or second) set corresponds to the radial distance between the central axis of blade 80 the midpoint of the horizontal blade 84 (or 85) which severed the slice.

Each helical slice in the first set is intertwined with a corresponding slice in the second set, with the loops of each slice in the first set occupying spaces between the loops of a corresponding slice in the second set. For example, in FIG. 21, helical slice 95 (the slice having smallest radius from the first set of slices of potato 90) is initially intertwined with helical slice 96 (the corresponding slice from the second set of slices of potato 90), immediately after slices 95 and 96 disengage from rotating knife 81. In FIG. 21, intertwined slices 95 and 96 are shown in phantom view (identified by reference numerals 95' and 96') in the positions they would initially occupy just after disengaging from knife 81.

As intertwined slices 95 and 96 fall away from knife 81 generally along the axis of separator tube 100 (within the volume enclosed by chute 119, shown in FIG. 24), tube 100 disentangles the intertwined loops of slices 95 and 96 (as a result of the centrifugal force produced by its end portion 101 turning at high speed). The curved end portion 101 of tube 100 is shown in FIG. 24. A pin 104 protrudes outward from end portion 101. As shown in FIG. 21, as knife assembly 81 rotates, pin 104 will momentarily restrain one of the slices (i.e., slice 95) while the action of rotating curved end portion 101 on slices 95 and 96 disengages these two slices from each other. Each of the resulting disengaged helical slices will have spaces between its loops (which spaces were formerly occupied by the slice with which the disengaged slice had initially been intertwined). For example, disengaged slice 95 shown in FIG. 22 has spaces 95a between its loops.

In a preferred embodiment, tube 100 is formed by bending an end portion of a length of straight metal tubing. The end portion (end portion 101, best shown in FIG. 24) is bent into a curved shape. The end of the straight tubing opposite the curved end is fitted around an end of cylindrical blade 80 (as shown in FIG. 24). A small hole is machined partially through the sidewall of the tubing's bent end portion, and pin 104 is mounted (i.e., welded) in such hole.

As shown in FIG. 23, blades 82, 84, and 86a are curvilinearly arranged, so that the outermost pair of adjacent blades 82 and 84 of rotating knife 81 will engage a potato before the innermost pair of adjacent blades 84 and 86a, thus reducing the torque needed to slice the potato. Similarly, blades 83, 85, and 86b are curvilinearly arranged, so that the outermost pair of adjacent blades 83 and 85 of rotating knife 81 will engage the potato before the innermost pair of adjacent blades 85 and 86b.

The method of the invention can be implemented using the above-described apparatus, and includes the steps of: (a) rotating a set of curvilinearly arranged knife blades in a substantially horizontal plane, by driving the blades with a gear means positioned below the blades (which can include knife bearing 31 and idler gear 35); (b) while performing step (a), forcing the object downward against the set of curvilinearly arranged knife blades, so that the knife blades sequentially engage the object; and (c) while performing step (a), directing a stream of flushing liquid (such as water) onto the gear means to flush fragments of the object from the gear means (for example, from between the meshing teeth of bearing 31 and gear 35, and from between bearing 31 and housing 33 which surrounds it). Due to the curvilinear arrangement of the knife blades, for the cylindrical object oriented with its longitudinal axis aligned with the axis of rotation of the blades, during step (b) the blades will commence to sever a largest diameter helical slice from the object before commencing to sever smaller diameter helical slices from the object. If the object has an elliptical shape (the typical shape of a potato), a smaller diameter portion of the object will engage the blades before the largest diameter portion of the object. In this case, the blades will commence to sever a small diameter helical slice from the object before commencing to sever a maximum diameter helical slice from the object.

In one class of preferred embodiments, step (b) includes the operations of: gripping the object between a pair of chains and counter-rotating the chains to translate the object downward into engagement with a pair of feed rolls; and then gripping the object between the feed rolls and counter-rotating the feed rolls to force the object gripped between them against the rotating set of curvilinearly arranged knife blades.

Preferably, the pair of chains is mounted around a pair of slidably mounted chain sprockets (i.e., sprockets 15 and 17, which are mounted at the end of slidably mounted shafts 26 and 28), and an inward biasing force is applied to the chain sprockets (i.e., by upper spring 43), so that as the object advances downward past the chain sprockets the object exerts an outward force against the chain sprockets which temporarily overcomes the inward biasing force and displaces the chain sprockets outward, and so that the inward biasing force restores the chain sprockets to their original position after the object advances downward beyond the chain sprockets. Preferably, the feed rolls are also slidably mounted (as are the above-described rolls 27, which are mounted at the end of slidably mounted shafts 23 and 25), and an inward biasing force is applied to the feed rolls (i.e., by lower spring 43), so that as the object advances downward between the feed rolls, the object exerts an outward force against the feed rolls which temporarily overcomes the inward biasing force and displaces the feed rolls outward, and so that the inward biasing force restores the feed rolls to their original position when the object has been sliced by the rotating set of curvilinearly arranged knife blades.

Various modifications and alterations in the described method and apparatus of the invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A slicing apparatus, including a knife assembly rotatably mounted to a housing, wherein the knife assembly includes:
    a knife carrier having a vertical axis of rotation;
    a first plate member attached to the knife carrier and defining a first curvilinearly arranged blade assembly including blades arranged in a first substantially horizontal plane along a first spiral path extending radially outward from the vertical axis of rotation, wherein the blades include a set of horizontally oriented blades and a set of vertically oriented blades; and
    a second plate member attached to the knife carrier, and defining a second curvilinearly arranged blade assembly including blades arranged in the first substantially horizontal plane along a second spiral path extending radially outward from the vertical axis of rotation.

2. The apparatus of claim 1, wherein the horizontally oriented blades and the vertically oriented blades of the first curvilinearly arranged blade assembly are positioned to engage an article substantially simultaneously and to sever helical slices from the article in a single, continuous cutting action as the knife assembly rotates.

3. A slicing apparatus, including a knife assembly rotatably mounted to a housing, wherein the knife assembly includes:
    a knife carrier having a vertical axis of rotation;
    a first plate member attached to the knife carrier and defining a first curvilinearly arranged blade assembly including blades arranged in a substantially horizontal plane along a first spiral path extending radially outwardly from the vertical axis of rotation, wherein the blades include a set of horizontal oriented blades and a set of vertically oriented blades;
    a second plate member attached to the knife carrier, and defining a second curvilinearly arranged blade assembly including blades arranged in a substantially horizontal plane along a second spiral path extending radially outward from the vertical axis of rotation;
    wherein the horizontally oriented blades and the vertically oriented blades of the first curvilinearly arranged blade assembly are positioned to engage an article substantially simultaneously and to sever helical slices from the article in a single, continuous cutting action as the knife assembly rotates; and
    a support tube attached to the first plate member and the second plate member, wherein the support tube includes vertically oriented blade surfaces.

4. The apparatus of claim 3, wherein a first of the vertically oriented blade surfaces of the support tube is positioned to engage the article substantially simultaneously with the horizontally oriented blades of the first curvilinearly arranged blade assembly as the knife assembly rotates.

5. A slicing apparatus, including a knife assembly rotatably mounted to a housing, wherein the knife assembly includes:
    a knife carrier having a vertical axis of rotation;
    a first plate member attached to the knife carrier and defining a first curvilinearly arranged blade assembly including blades arranged in a substantially horizontal plane along a first spiral path extending radially outward from the vertical axis of rotation, wherein the blades include a set of horizontally oriented blades and a set of vertically oriented blades;
    a second plate member attached to the knife carrier, and defining a second curvilinearly arranged blade assembly including blades arranged in a substantially horizontal plane along a second spiral path extending radially outward from the vertical axis of rotation; and
    a central cylindrical blade, mounted coaxially with the vertical axis of rotation.

6. The apparatus of claim 5, wherein the central cylindrical blade has an upper end defining a vertically oriented knife edge and a lower end, and wherein the knife assembly also includes:

a curved separator tube attached to the lower end of the central cylindrical blade.

7. The apparatus of claim 6, wherein the separator tube has a first end portion coaxially attached to the lower end of the central cylindrical blade, and a curved end portion opposite the first end portion, and also including:

a pin which protrudes out from the curved end portion of the separator tube.

8. A slicing apparatus, including a knife assembly rotatably mounted to a housing, wherein the knife assembly includes:

a knife carrier having a vertical axis of rotation;

a first plate member attached to the knife carrier, wherein the first plate member defines a curvilinearly arranged first blade assembly including blades arranged in a substantially horizontal plane along a first spiral path extending radially outward from the vertical axis of rotation;

a second plate member attached to the knife carrier, wherein the second plate member defines a curvilinearly arranged second blade assembly including blades arranged in a substantially horizontal plane along a second spiral path extending radially outward from the vertical axis of rotation, wherein the first blade assembly and the second blade assembly are positioned to slice an article into one or more sets of intertwined pairs of helical slices;

a cylindrical central blade, mounted coaxially with the vertical axis of rotation; and a separator means fixedly attached to the central blade for disentangling at least one of the intertwined pairs of helical slices into two separate helical slices.

9. The apparatus of claim 8, wherein the central blade has an upper end defining a vertically oriented knife edge and a lower end, and wherein the separator means includes a curved separator tube attached to the lower end of the central blade.

10. The apparatus of claim 9, wherein the separator tube has a first end portion coaxially attached to the lower end of the central blade, and a curved end portion opposite the first end portion, and also including:

a pin which protrudes out from the curved end portion of the separator tube.

* * * * *

UNITED STATES PATENT AND TRADEMARK OFFICE
CERTIFICATE OF CORRECTION

PATENT NO. : 5,224,409

DATED : July 6, 1993

INVENTOR(S) : Frederick J. Cimperman and Klaus Silbermann

It is certified that error appears in the above - identified patent and that said Letters Patent is hereby corrected as shown below:

In Col. 3, line 47, delete "FIG. 11" and insert --FIG. 1--.

Signed and Sealed this

Twenty-second Day of February, 1994

Attest:

BRUCE LEHMAN

*Attesting Officer*  *Commissioner of Patents and Trademarks*